(12) United States Patent
Whangbo et al.

(10) Patent No.: US 9,081,197 B2
(45) Date of Patent: Jul. 14, 2015

(54) LENS SUBSTRATE, METHOD OF MANUFACTURING THE LENS SUBSTRATE AND LENS PANEL HAVING THE LENS SUBSTRATE

(75) Inventors: Sang-Woo Whangbo, Seoul (KR); Jin-Hwan Kim, Suwon-si (KR); Seung-Jun Jeong, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 371 days.

(21) Appl. No.: 13/616,390

(22) Filed: Sep. 14, 2012

(65) Prior Publication Data
US 2013/0107147 A1   May 2, 2013

(30) Foreign Application Priority Data
Oct. 31, 2011   (KR) .......................... 10-2011-0111731

(51) Int. Cl.
*G02F 1/1335*   (2006.01)
*G02B 27/22*   (2006.01)
*G02F 1/1343*   (2006.01)
*G02F 1/1347*   (2006.01)

(52) U.S. Cl.
CPC .......... *G02B 27/2214* (2013.01); *G02F 1/1347* (2013.01); *G02F 1/134309* (2013.01); *G02F 2203/28* (2013.01)

(58) Field of Classification Search
CPC .. G02F 1/29; G02F 2001/294; G02B 27/2214
USPC ..................................... 349/15, 200
See application file for complete search history.

(56) References Cited

U.S. PATENT DOCUMENTS

2011/0032438 A1 * 2/2011 Yun et al. ......................... 349/15
2013/0169913 A1 * 7/2013 Choi et al. ..................... 349/110

FOREIGN PATENT DOCUMENTS

| JP | 2009069458 A | 4/2009 |
| KR | 1020100059587 A | 6/2010 |
| KR | 1020100069432 A | 6/2010 |

* cited by examiner

*Primary Examiner* — Thanh-Nhan P Nguyen
(74) *Attorney, Agent, or Firm* — Cantor Colburn LLP

(57) ABSTRACT

A lens substrate includes a base substrate, a first lens electrode and a first signal line. The base substrate includes a lens area and a peripheral area surrounding the lens area. The first signal line is in the peripheral area and includes a layered structure in which a first transparent conductive layer and a metal layer directly contact each other. The first lens electrode is in the lens area and includes the first transparent conductive layer excluding the metal layer. The first signal line is in the peripheral area. The first signal line is connected to the first lens electrode and includes a layered structure in which the first transparent conductive layer and the metal layer directly contact each other.

20 Claims, 9 Drawing Sheets

LENS SUBSTRATE, METHOD OF MANUFACTURING THE LENS SUBSTRATE AND LENS PANEL HAVING THE LENS SUBSTRATE

This application claims priority to Korean Patent Application No. 10-2011-0111731, filed on Oct. 31, 2011, and all the benefits accruing therefrom under 35 U.S.C. §119, the contents of which are incorporated by reference herein in their entireties.

BACKGROUND OF THE INVENTION

1. Field of the Invention

Exemplary embodiments of the invention relate to a lens substrate, a method of manufacturing the lens substrate, and a lens panel including the lens substrate. More particularly, exemplary embodiments of the invention relate to a lens substrate to decrease a manufacturing cost, a method of manufacturing the lens substrate, and a lens panel including the lens substrate.

2. Discussion of the Related Art

As a demand for a three-dimensional ("3D") stereoscopic image in industrial fields such as a film, a game, and so on, increases, a stereoscopic image display apparatus displaying the 3D stereoscopic image has been improved. The stereoscopic image display apparatus displays the 3D stereoscopic image by respectively providing two-dimensional ("2D") images which are different from each other, to left and right eyes of an observer. Thus, the observer recognizes a pair of two different 2D images, and the pair of two different 2D images is mixed in a brain of the observer, so that the observer may perceive the 3D stereoscopic image.

The stereoscopic image display apparatus is classified into a stereoscopic type display and an auto-stereoscopic type display according to whether or not the observer wears special glasses. Conventionally, the auto-stereoscopic type display such as a barrier type display, a lenticular type display and so on is used for a flat display apparatus.

BRIEF SUMMARY OF THE INVENTION

Exemplary embodiments of the invention provide a lens substrate capable of simplifying a manufacturing process.

Exemplary embodiments of the invention also provide a method of manufacturing the lens substrate.

Exemplary embodiments of the invention also provide a lens panel including the lens substrate.

According to an exemplary embodiment of the invention, a lens substrate includes a base substrate, a first lens electrode and a first signal line. The base substrate includes a lens area and a peripheral area surrounding the lens area. The first signal line is in the peripheral area and includes a layered structure in which a first transparent conductive layer and a metal layer directly contact each other. The first lens electrode is in the lens area and includes the first transparent conductive layer excluding the metal layer. The first signal line is connected to the first lens electrode.

In an exemplary embodiment, the lens substrate may further include a second lens electrode in the lens area, and a second signal line in the peripheral area. The second lens electrode may include a second transparent conductive layer. The second signal line may be connected to the second lens electrode. The second signal line may include a layered structure in which the first transparent conductive layer and the metal layer directly contact each other.

In an exemplary embodiment, the lens substrate may further include a plurality of the first lens electrodes and a plurality of the second lens electrodes. Each of the first and second lens electrodes extends along a lens axis inclined with respect to a first axis, and the first and second lens electrodes alternate along a second axis which crosses the first axis, in a plan view.

In an exemplary embodiment, the lens substrate may further include a first pad electrode in the peripheral area, and a second pad electrode in the peripheral area. The first pad electrode may be connected to the first signal line. The second pad electrode may be connected to the second signal line. Each of the first and second pad electrodes may include a layered structure in which the first transparent conductive layer and the metal layer directly contact each other.

In an exemplary embodiment, the lens substrate may further include an insulation layer between the first lens electrode and the second lens electrode. The insulation layer may include a first contact hole exposing an end portion of the first lens electrode, a second contact hole exposing the first signal line adjacent to the first lens electrode, and a third contact hole exposing the second signal line adjacent to an end portion of the second lens electrode.

In an exemplary embodiment, the first lens electrode may contact the base substrate, and the second lens electrode contacts the insulation layer.

In an exemplary embodiment, the lens substrate may further include a first connecting line including the second transparent conductive layer, and a second connecting line integrally formed continuous with the second lens electrode. The first connecting line may connect the first lens electrode to the first signal line through the first and second contact holes. The second connecting line may be integrally formed continuous with the second lens electrode and connect the second lens electrode to the second signal line through the third contact hole.

In an exemplary embodiment, the lens substrate may further include an insulation layer. The insulation layer may include a fourth contact hole exposing the first pad electrode, a fifth contact hole exposing the first signal line adjacent to the first pad electrode, a sixth contact hole exposing the second pad electrode, and a seventh contact hole exposing the second signal line adjacent to the second pad electrode.

In an exemplary embodiment, the lens substrate may further include a first pad connecting electrode including the second transparent conductive layer, and a second pad connecting electrode including the second transparent conductive layer. The first pad connecting electrode may connect the first signal line to the first pad electrode through the fourth and fifth contact holes. The first pad connecting electrode may overlap the first pad electrode. The second pad connecting electrode may connect the second signal line to the second pad electrode through the sixth and seventh contact holes. The second pad connecting electrode may overlap the second pad electrode According to another exemplary embodiment of the invention, a method for manufacturing a lens substrate includes forming a first transparent conductive layer and a metal layer on a base substrate including a lens area, and a peripheral area surrounding the lens area, patterning the first transparent conductive and the metal layer using a same mask to form a first signal line in the peripheral area and a plurality of first lens electrode in the lens area, forming an insulation layer including a first contact hole and a second contact hole, forming a second transparent conductive layer on the insulation layer including the first and second contact holes, and patterning the second transparent conductive layer to form a first connecting line and a second lens electrode. The first signal line includes a layered structure in which the first transparent conductive layer and the metal layer directly contact each other. The first lens electrode includes the first transparent conductive layer and excludes the metal layer. The first contact hole exposes an end portion of the first lens electrode. The second contact hole exposes the first signal line adjacent to the end portion of the first lens electrode. The first connecting line connects the first lens electrode to the first signal line through the first and second contact holes. The second lens electrode is between adjacent first lens electrodes in a plan view.

In an exemplary embodiment, the forming the first lens electrode may include forming a second signal line including a layered structure in which the first transparent conductive layer and the metal layer directly contact each other, in the peripheral area.

In an exemplary embodiment, the forming the first lens electrode may include forming first and second pad electrodes including a layered structure in which the first transparent conductive layer and the metal layer directly contact each other, in the peripheral area.

In an exemplary embodiment, the forming the first lens electrode may further include forming a first photo pattern and a second photo pattern on the metal layer, the first photo pattern having a first thickness and formed in an area in which the first and second signal lines and the first and second pad electrodes are formed, forming the first and second signal lines and the first and second pad electrodes using the first and second photo patterns, removing the second photo pattern and forming a third photo pattern disposed on the first and second signal lines and the first and second pad electrodes, and removing the metal layer using the third photo pattern to form the first lens electrode. The second photo pattern may have a second thickness smaller than the first thickness and be formed in an area in which the first lens electrode is formed. Each of the first and second signal lines and the first and second pad electrodes may include a layered structure in which the first transparent conductive layer and the metal layer directly contact each other. A portion of the first photo pattern may be removed to form the third photo pattern In an exemplary embodiment, the forming the insulation layer may include forming a third contact hole through the insulation layer. The third contact hole may expose an end portion of the second lens electrode.

In an exemplary embodiment, the forming the second lens electrode may include forming a second connecting line. The second connecting line may be integrally formed continuous with the second lens electrode and connect the second lens electrode to the second signal line through the third contact hole.

In an exemplary embodiment, the forming the insulation layer may include forming a fourth contact hole, fifth contact hole, sixth contact hole and seventh contact hole. The fourth contact hole may expose the first pad electrode. The fifth contact hole may expose the first signal line adjacent to the first pad electrode. The sixth contact hole may expose the second pad electrode. The seventh contact hole may expose the second signal line adjacent to the second pad electrode.

In an exemplary embodiment, the forming the second lens electrode may include forming a first pad connecting electrode and a second pad connecting electrode. The first pad connecting electrode may connect the first signal line to the first pad electrode through the fourth and fifth contact holes and overlap the first pad electrode. The second pad connecting electrode may connect the second signal line to the second pad electrode through the sixth and seventh contact holes and overlap the second pad electrode.

In an exemplary embodiment, the method for manufacturing a lens substrate may further include forming a column spacer on the second lens electrode.

According to still another exemplary embodiment of the invention, a lens panel includes a lens substrate, an opposite substrate facing the lens substrate, and a liquid crystal layer between the lens substrate and the opposite substrate. The lens substrate includes a base substrate including a lens area and a peripheral area surrounding the lens area, a first signal line in the peripheral area and including a layered structure in which a first transparent conductive layer and a metal layer directly contact each other, and a first lens electrode in the lens area and including a first transparent conductive layer. The first signal line is in the peripheral area and is connected to the first lens electrode. The first signal line includes a layered structure in which the first transparent conductive layer and the metal layer directly contact each other.

In an exemplary embodiment, the lens substrate may further include a pad electrode in the peripheral area and connected to the signal line. The pad electrode may include a layered structure in which the first transparent conductive layer and the metal layer directly contact each other.

According to the exemplary embodiments of the invention, a signal line of a lens panel and pad electrode of the lens panel are formed by a same mask, so that a manufacturing process of the lens panel may be simplified. Thus, a manufacturing cost of the lens panel and a display apparatus may be decreased.

BRIEF DESCRIPTION OF THE DRAWINGS

The above and other features of the invention will become more apparent by describing in detail exemplary embodiments thereof with reference to the accompanying drawings, in which.

DETAILED DESCRIPTION OF THE INVENTION

Figure 1:
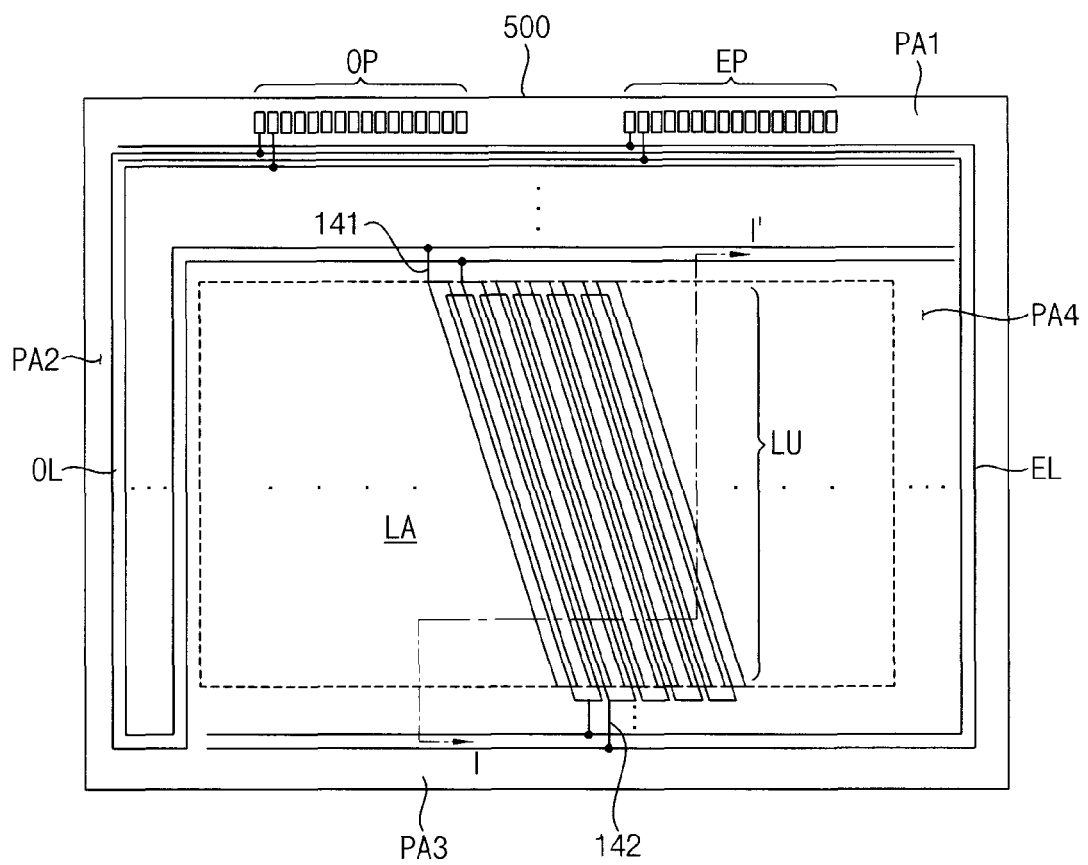
FIG. 1 is a plan view illustrating an exemplary embodiment of a lens panel according to the invention.
Figure 1:
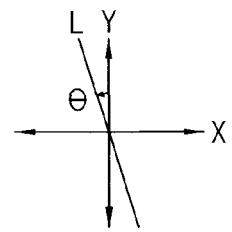

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In a lenticular type stereoscopic image display apparatus, light passing through left and right pixels is refracted by using a lens, and a three-dimensional ("3D") stereoscopic image may be displayed. The brightness of the lenticular type display may be greater than that in a barrier type display since most of the light passes through the lens. The stereoscopic image display apparatus includes a film on which a lens, such as the lenticular lens, is attached to a liquid display panel. Accordingly, the display apparatus which includes a lens film only displays the 3D stereoscopic image.

However, a two-dimensional ("2D") image is used more than the 3D stereoscopic image as a source image signal. Thus, a display apparatus capable of displaying both the 2D and 3D images is desired. To display both the 2D and 3D images, a liquid display panel which selectively displays the 2D image or the 3D stereoscopic image according to a 2D mode or a 3D mode has been developed. The liquid display panel includes a lens substrate including a plurality of lens electrodes which collectively perform as a lens.

Hereinafter, the invention will be explained in detail with reference to the accompanying drawings.

Figure 2:
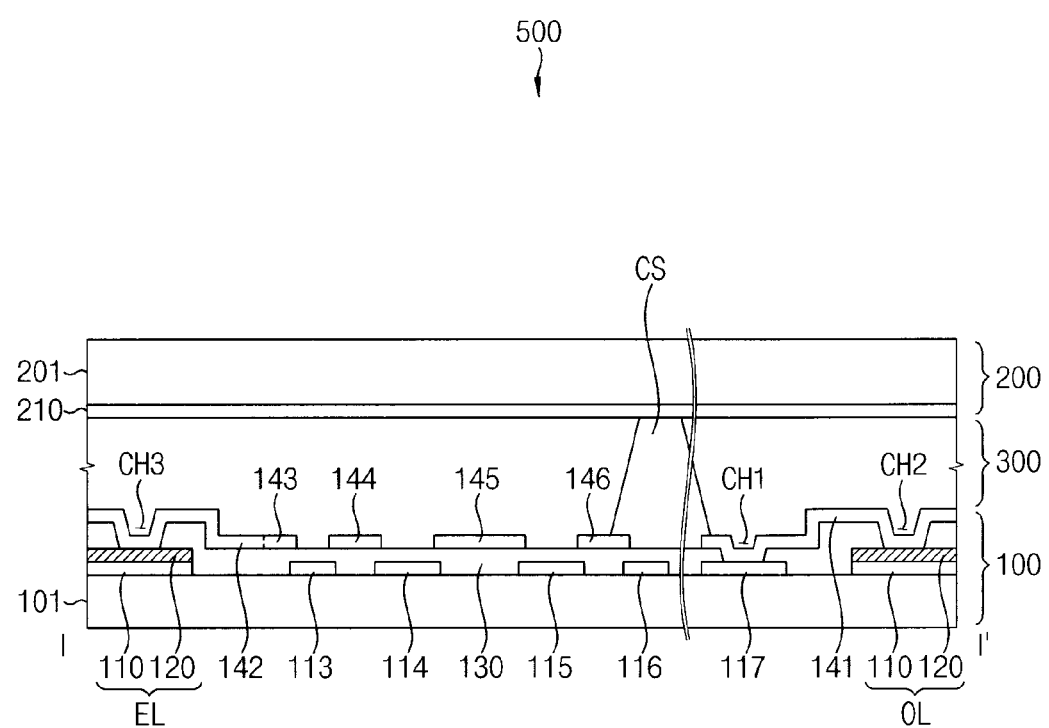
FIG. 2 is a cross-sectional view taken along line I-I' of FIG. 1.

FIG. 1 is a plan view illustrating an exemplary embodiment of a lens panel according to the invention. FIG. 2 is a cross-sectional view taken along line I-I' of FIG. 1.

Referring to FIGS. 1 and 2, a lens panel 500 is driven as a transparent panel in a 2D mode. The lens panel 500 is driven as a lens panel for displaying a 3D stereoscopic image in a 3D mode. The lens panel 500 may be driven as a preset Fresnel lens, a lenticular lens and so on, in the 3D mode.

The lens panel 500 includes a lens area LA, and a peripheral area PA surrounding the lens area LA. A plurality of unit lenses LU is disposed in the lens area LA. A plurality of first signal lines OL, a plurality of second signal lines EL, a plurality of first pads OP electrically connected to the first signal lines OL to receive a plurality of first driving signals, and a plurality of second pads EP electrically connected to the second signal lines EL to receive a plurality of second driving signals are in the peripheral area PA, to drive the unit lenses LU.

In one exemplary embodiment, for example, the lens panel 500 includes a lens substrate 100, an opposite substrate 200, and liquid crystal layer 300. The lens substrate 100 includes a first base substrate 101. The opposite substrate 200 includes a second base substrate 201. The liquid crystal layer 300 is disposed between the first base substrate 101 and the second base substrate 201, and between the lens substrate 100 and the opposite substrate 200.

A plurality of first lens electrodes 113, 114, 115, 116 and 117 and a plurality of second lens electrodes 143, 144, 145 and 146 respectively corresponding to the unit lenses LU are in the lens area LA of the first base substrate 101.

The first lens electrodes 113, 114, 115, 116 and 117 extend along a lens axis L inclined with respect to a perpendicular axis Y, and are arranged along a parallel axis X crossing the perpendicular axis Y. The second lens electrodes 143, 144, 145 and 146 extend along the lens axis L and are arranged along the parallel axis X. Widths of the first lens electrodes 113, 114, 115, 116 and 117 may be different from each other. The widths are taken perpendicular to the lens axis L. Alternatively, at least one of the first lens electrodes 113, 114, 115, 116 and 117 may have the width different from that of a remainder of the first lens electrodes. The first lens electrodes 113, 114, 115, 116 and 117 may be a first transparent conductive pattern patterned from a first transparent conductive layer.

The second lens electrodes 143, 144, 145 and 146 are disposed on the first lens electrodes 113, 114, 115, 116 and 117. Each of the second lens electrodes 143, 144, 145 and 146 are disposed between respectively adjacent first lens electrodes 113, 114, 115, 116 and 117, in the plan view. An insulation layer 130 is disposed between the first lens electrodes 113, 114, 115, 116 and 117 and the second lens electrodes 143, 144, 145 and 146. Widths of the second lens electrodes 143, 144, 145 and 146 may be different from each other. The widths are taken perpendicular to the lens axis L. Alternatively, at least one of the second lens electrodes 143, 144, 145 and 146 may have the width different from that of a remainder of the second lens electrodes. The second lens electrodes 143, 144, 145 and 146 may be a second transparent conductive pattern patterned from a second transparent conductive layer.

The first pads OP, the second pads EP, the first signal lines OL and the second signal lines EL are disposed in the peripheral area PA of the first base substrate 101. In one exemplary embodiment, for example, the peripheral area PA includes a first area PA1, a second area PA2 adjacent to the first area PA1, a third area PA3 opposite to the first area PA1, and a fourth area PA4 opposite to the second area PA2.

The first pads OP and the second pads EP are disposed in the first area PA1. The first pads OP are electrically connected to the first signal lines OL, respectively. The second pads EP are electrically connected to the second signal lines EL, respectively.

The first signal lines OL may be disposed in the first area PA1 and the second area PA2. The second signal lines EL may be disposed in the first, third and fourth areas PA1, PA3 and PA4. The first signal lines OL may be electrically connected to the first lens electrodes 113, 114, 115, 116 and 117. The second signal lines EL may be electrically connected to the second lens electrodes 143, 144, 145 and 146. In one exemplary embodiment, for example, each of the first signal lines OL is connected to the first lens electrode 117 through a first connecting line 141. Each of the second signal lines EL is connected to the second lens electrode 143 through a second connecting line 142.

Each of the first pads OP, the second pads EP, the first signal lines OL and the second signal lines EL includes a double-layered structure in which a first transparent conductive layer and a metal layer directly contact each other. As illustrated in FIG. 2, the first signal lines OL include a first transparent conductive layer 110, and a metal layer 120 directly on the first transparent conductive layer 110. The second signal lines EL include the first transparent conductive layer 110, and the metal layer 120 directly on the first transparent conductive layer 110. Although not shown in figures, each of the first pads OP and the second pads EP may include the layered structure in which the first transparent conductive layer 110 and the metal layer 120 directly contact each other.

The lens substrate 100 may further include a column spacer CS. The column spacer CS maintains a gap between the lens substrate 100 and the opposite substrate 200, so that the liquid crystal layer 300 may have a uniform thickness.

The opposite substrate 200 includes a common electrode layer 210 disposed on the second base substrate 201. The common electrode layer 210 is electrically short-circuited with a short point disposed in the peripheral area PA of the lens substrate 100 to receive a driving signal.

Figure 3A:
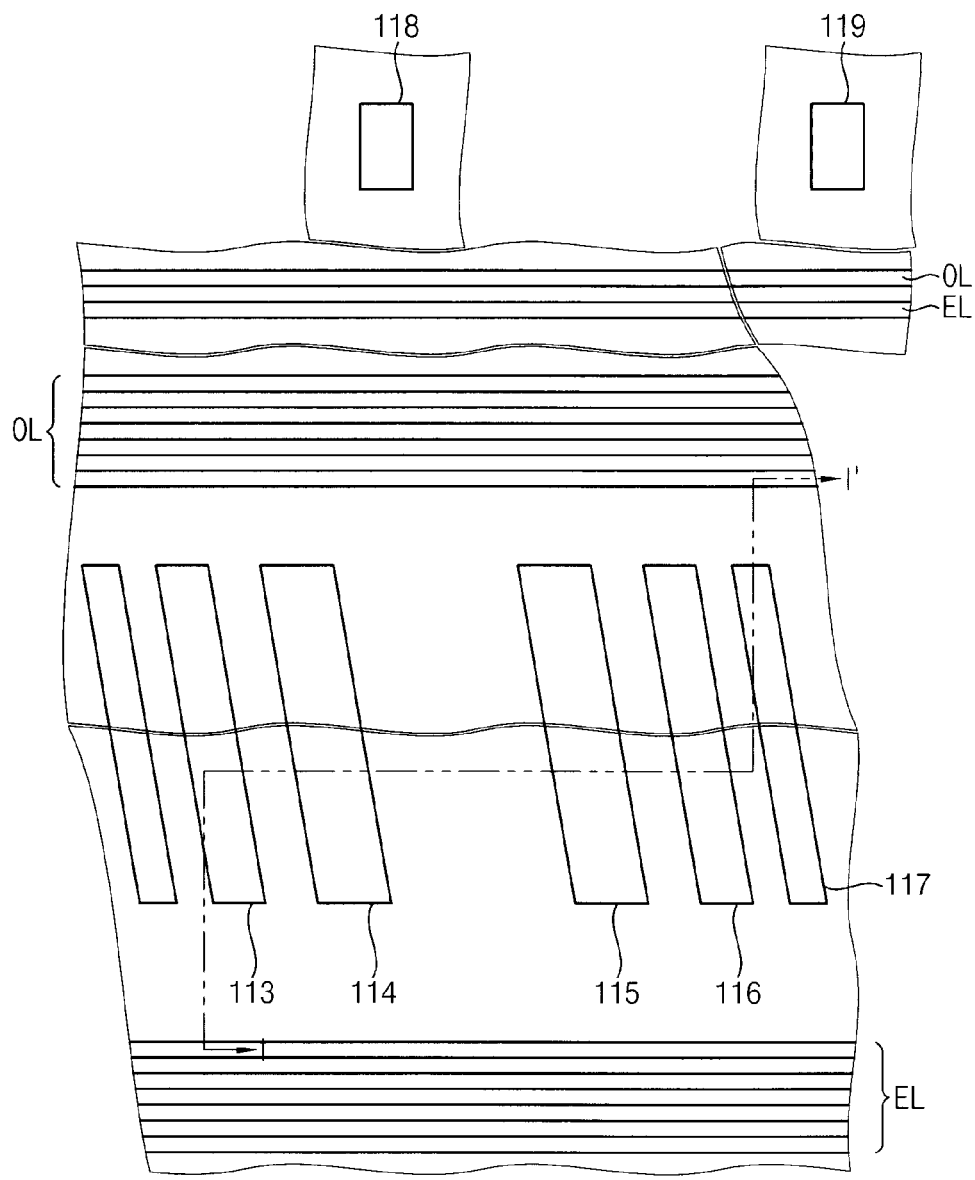
FIGS. 3A to 3C are plan views illustrating an exemplary embodiment of a method of manufacturing a lens substrate of FIG. 2.
Figure 3B:
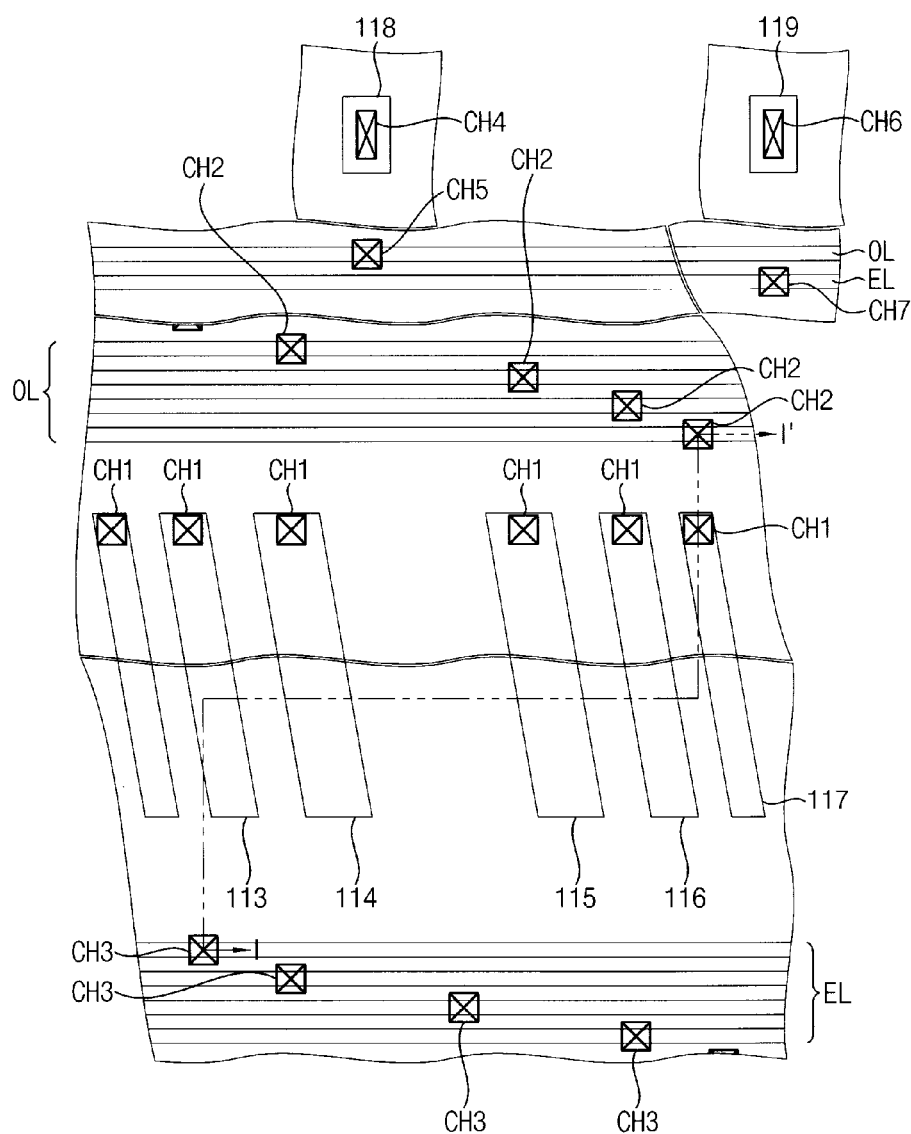
Figure 3C:
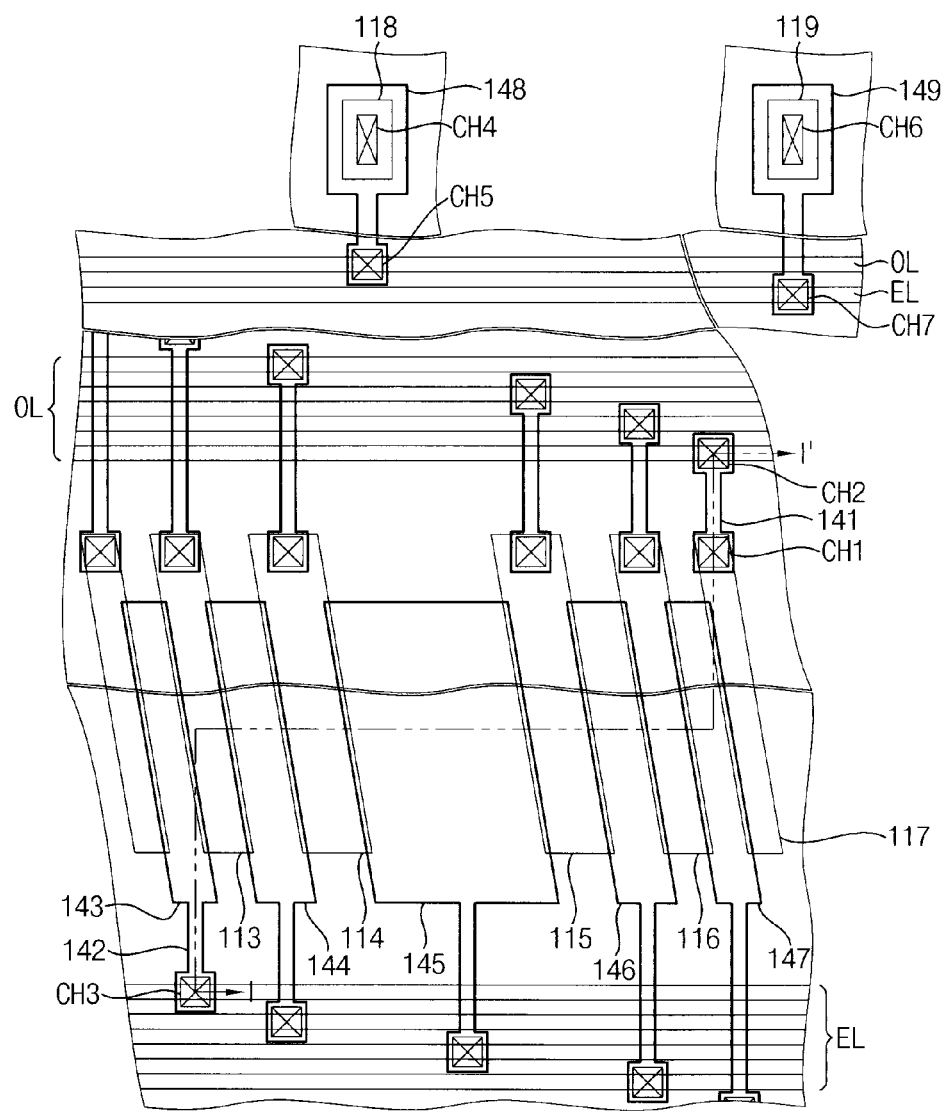

FIGS. 3A to 3C are plan views illustrating an exemplary embodiment of a method of manufacturing the lens substrate of FIG. 2. FIGS. 4A to 4E are cross-sectional views illustrating the exemplary embodiment of the method of manufacturing the lens substrate of FIG. 2.

Figure 4A:
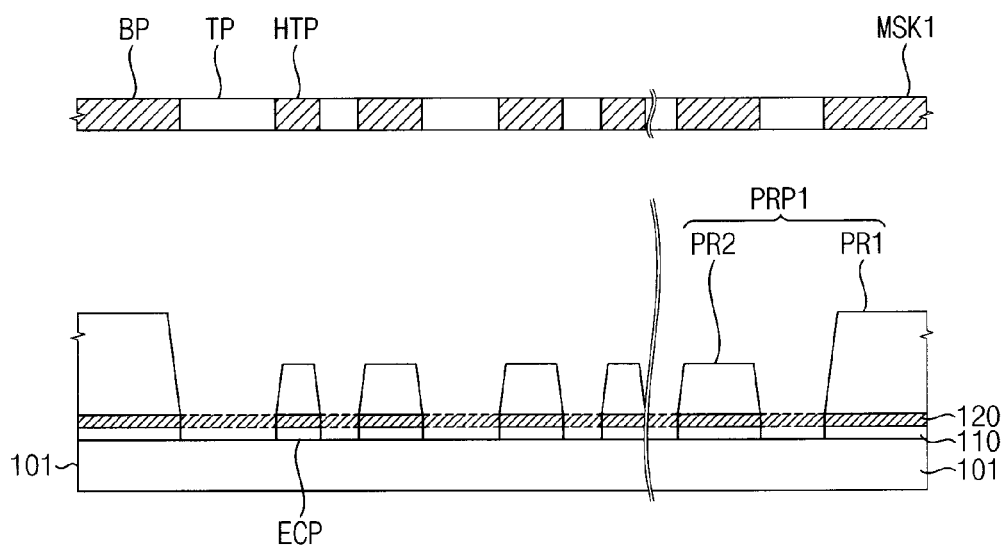
FIGS. 4A to 4E are cross-sectional views illustrating the exemplary embodiment of the method of manufacturing the lens substrate of FIG. 2.

Referring to FIGS. 3A and 4A, the first transparent conductive layer 110 and the metal layer 120 are sequentially formed on the first base substrate 101. The first transparent conductive layer 110 may include a transparent conductive oxide such as indium zinc oxide ("IZO") or indium tin oxide ("ITO"). The metal layer 120 may include a metal such as chrome, aluminum, tantalum, molybdenum, titanium, tungsten, copper, silver and so on, or an alloy thereof. In addition, the metal layer 120 may include a plurality of layers having a physical property different from each other.

A photoresist layer is formed on the first base substrate 101 on which the first transparent conductive layer 110 and the metal layer 120 are previously formed. A first photoresist pattern PRP1 is formed from the photoresist layer using a first mask MSK1. The first mask MSK1 includes a light blocking portion BP, a transmissive portion TP and a transflective portion HTP. The light blocking portion BP blocks light. The transmissive portion TP transmits the light. The transflective portion HTP includes a slit pattern or a half tone pattern to partially transmit the light.

The first photoresist pattern PRP1 includes a first photo pattern PR1 having a first thickness formed by the light blocking portion BP. The first photoresist pattern PRP1 includes a second photo pattern PR2 having a second thickness formed by the transflective portion HTP. The second thickness is smaller than the first thickness. The thicknesses are taken perpendicular to the first base substrate 101. In one exemplary embodiment, for example, the photoresist layer may include a positive type photoresist material in which a region exposed to the light is removed, but alternatively, the photoresist layer may include a negative type photoresist material in which a region exposed to the light remains.

The second photo pattern PR2 is formed directly on the metal layer 120 and directly on the first lens electrodes 113, 114, 115, 116 and 117. The first photo pattern PR1 is formed directly on the metal layer 120 and in an area in which the first signal lines OL, second signal lines EL, the first pads OP and the second pads EP are formed.

The metal layer 120 and the first transparent conductive layer 110 are patterned using the first and second photo patterns PR1 and PR2, to form a plurality of conductive patterns ECP on the first base substrate 101. The conductive patterns ECP initially include both the first transparent conductive layer 110 and the metal layer 120.

The conductive pattern ECP is formed on the first base substrate 101 on which the first lens electrodes 113, 114, 115, 116 and 117, the first signal lines OL, second signal lines EL, the first pads OP and the second pads EP are formed.

Figure 4B:
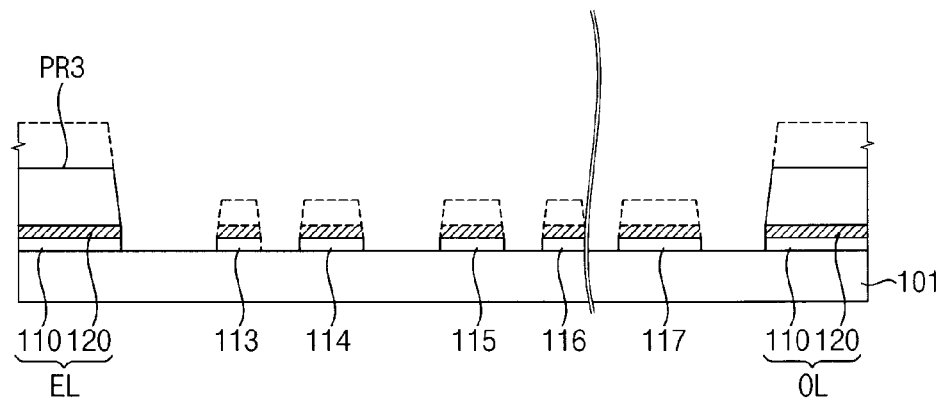

Referring to FIGS. 3A, 4A and 4B, the first and second photo patterns PR1 and PR2 are removed via an etch-back process by a predetermined thickness. Accordingly, the second photo pattern PR2 having the second thickness is effectively totally removed, and the first photo pattern PR1 having the first thickness remains as a third photo pattern PR3 having a third thickness smaller than the first thickness on the first base substrate 101.

Thus, the third photo pattern PR3 is formed on the first base substrate 101 on which the first signal lines OL, the second signal lines EL, the first pads OP and the second pads EP are formed.

A portion of the conductive pattern ECP exposed by the third photo pattern PR3 is removed using the third photo pattern PR3 as a mask. As illustrated in FIG. 4B, the metal layer 120 of the conductive pattern ECP exposed in forming the third photo pattern PR3 is removed using the third photo pattern PR3 as a mask. Accordingly, the first lens electrodes 113, 114, 115, 116 and 117 including the first transparent conductive layer 110 excluding the metal layer 120 are formed on the first base substrate 101. The third photo pattern PR3 is removed to form the first signal lines OL, the second signal lines EL, a first pad electrode 118 of the first pads OP and a second pad electrode 119 of the second pads EP on the first base substrate 101.

Each of the first signal lines OL, the second signal lines EL, the first pad electrode 118 and the second pad electrode 119 includes the first transparent conductive layer 110 and the metal layer 120. Here, the first transparent conductive layer 110 and the metal layer 120 directly contact each other and are sequentially stacked on each other.

Figure 4C:
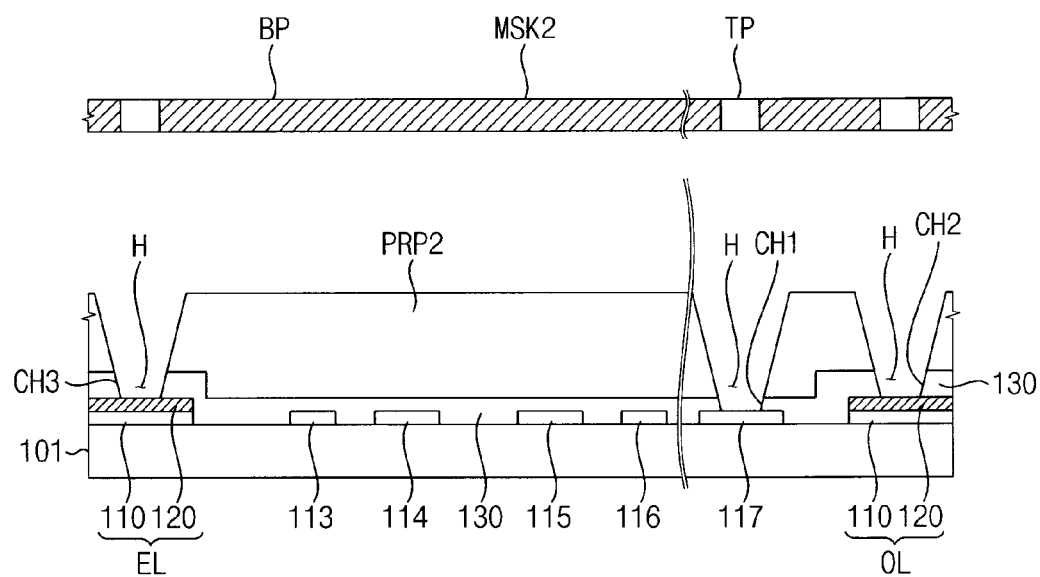

Referring to FIGS. 3B and 4C, an insulating layer 130 is formed on the first base substrate 101 on which the first lens electrodes 113, 114, 115, 116 and 117 are previously formed. The insulating layer 130 may include silicon nitride.

A photoresist layer is formed on the first base substrate 101 on which the insulating layer 130 is previously formed. The photoresist layer is patterned using a second mask MSK2 to form a second photoresist pattern PRP2. The second mask MSK2 includes a light blocking portion BP and a transmissive portion TP. The second photoresist pattern PRP2 includes a plurality of holes H extended through a thickness thereof. The holes H correspond to contact holes CH1, CH2, CH3, CH4, CH5, CH6 and CH7 of the lens substrate 100.

The insulating layer 130 is removed using the second photoresist pattern PRP2 to form the contact holes CH1, CH2, CH3, CH4, CH5, CH6 and CH7 on the first base substrate 101.

In one exemplary embodiment, for example, the first contact hole CH1 exposes an end portion of the first lens electrode 117. The second contact hole CH2 exposes a portion of a respective first signal line OL adjacent to the end portion of the first lens electrode 117. Thus, the second contact hole CH2 exposes a portion of the respective first signal line OL adjacent to the lens area LA in the first area PAL The third contact hole CH3 exposes a portion of a respective second signal line EL adjacent to the end portion of the second lens electrode 143. Thus, the third contact hole CH3 exposes a portion of the respective second signal line EL adjacent to the lens area LA in the third area PA3.

The fourth contact hole CH4 exposes the first pad electrode 118. The contact hole CH5 exposes a portion of a respective first signal line OL adjacent to the end portion of the first pad electrode 118 in the first area PAL A sixth contact hole CH6 exposes the second pad electrode 119. A seventh contact hole CH7 exposes a portion of a respective second signal line EL adjacent to the second pad electrode 119 in the first area PA1.

Figure 4D:
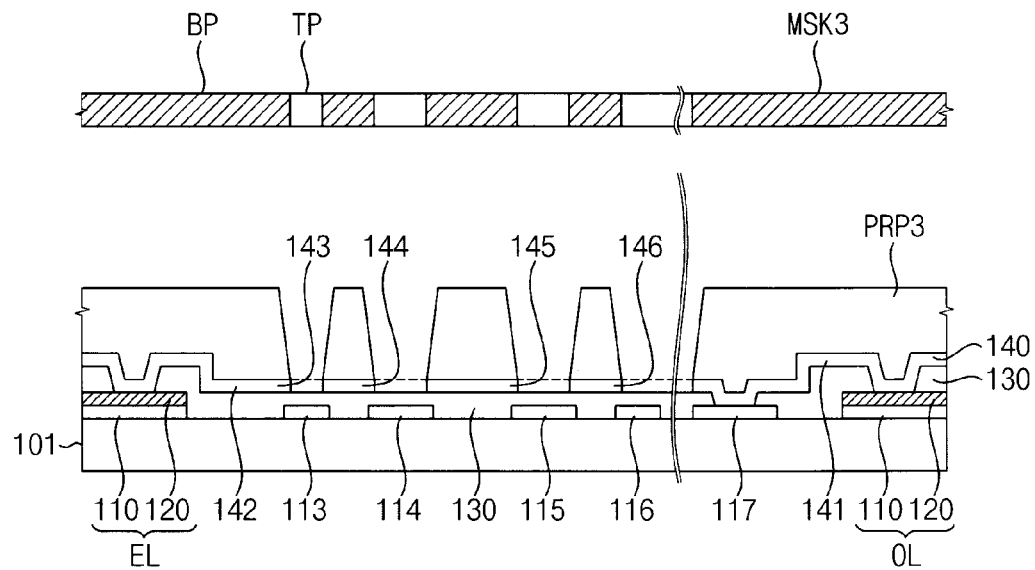

Referring to FIGS. 3C, 4C and 4D, a second transparent conductive layer 140 is formed on the first base substrate 101 on which the contact holes CH1, CH2, CH3, CH4, CH5, CH6 and CH7 are previously formed. The second transparent conductive layer 140 may include a transparent conductive oxide such as IZO or ITO.

A photoresist layer is formed on the first base substrate 101 on which the second transparent conductive layer 140 is previously formed. A third photoresist pattern PRP3 is formed from the photoresist layer using a third mask MSK3. The third mask MSK3 includes a light blocking portion BP and a transmissive portion TP.

The second transparent conductive layer 140 is patterned using the third photoresist pattern PRP3 to form a first connecting line 141, a second connecting line 142, the second lens electrodes 143, 144, 145, 146 and 147, a first pad connecting electrode 148 of the first pad OP, and a second pad connecting electrode 149 of the second pad EP.

The first connecting line 141 connects the respective first signal line OL to the first lens electrode 117 through the first and second contact holes CH1 and CH2. The second connecting line 142 is integrally formed with the second lens electrode 143, such that the second connecting line 142 and the second lens electrode 143 are a single, unitary, continuous, indivisible member. The second connecting line 142 connects the second lens electrode 143 to the respective second signal line EL through the third contact holes CH3.

Each of the second lens electrodes 143, 144, 145, 146 and 147 is disposed between adjacent first lens electrodes 113, 114, 115, 116 and 117 in the plan view. Boundaries of the second lens electrodes 143, 144, 145, 146 and 147 may partially overlap boundaries of the first lens electrodes 113, 114, 115, 116 and 117, respectively.

The first pad connecting electrode 148 connects the first pad electrode 118 to the respective first signal line OL through the fourth and fifth contact holes CH4 and CH5. The first pad connecting electrode 148 overlaps the first pad electrode 118. The second pad connecting electrode 149 connects the second pad electrode 119 to the respective second signal line EL through the sixth and seventh contact holes CH6 and CH7. The second pad connecting electrode 149 overlaps the second pad electrode 119.

Figure 4E:
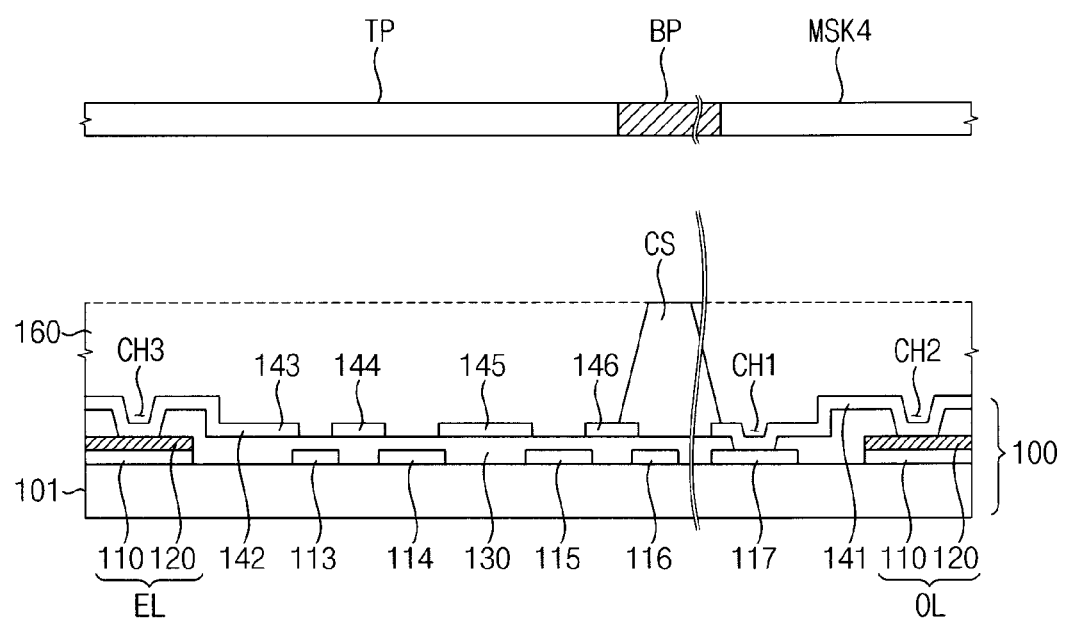

Referring to FIGS. 3C, 4D and 4E, a transparent photoresist layer 160 is formed on the first base substrate 101 on which the first connecting line 141, the second connecting line 142, the second lens electrodes 143, 144, 145, 146 and 147, the first pad connecting electrode 148 and the second pad connecting electrode 149 are previously formed. The transparent photoresist layer 160 is patterned using a fourth mask MSK4 to form the column spacer CS.

According to the exemplary embodiment, a manufacturing process may be simplified by patterning the signal lines, the pad electrodes and the first lens electrodes using a same mask.

Figure 5:
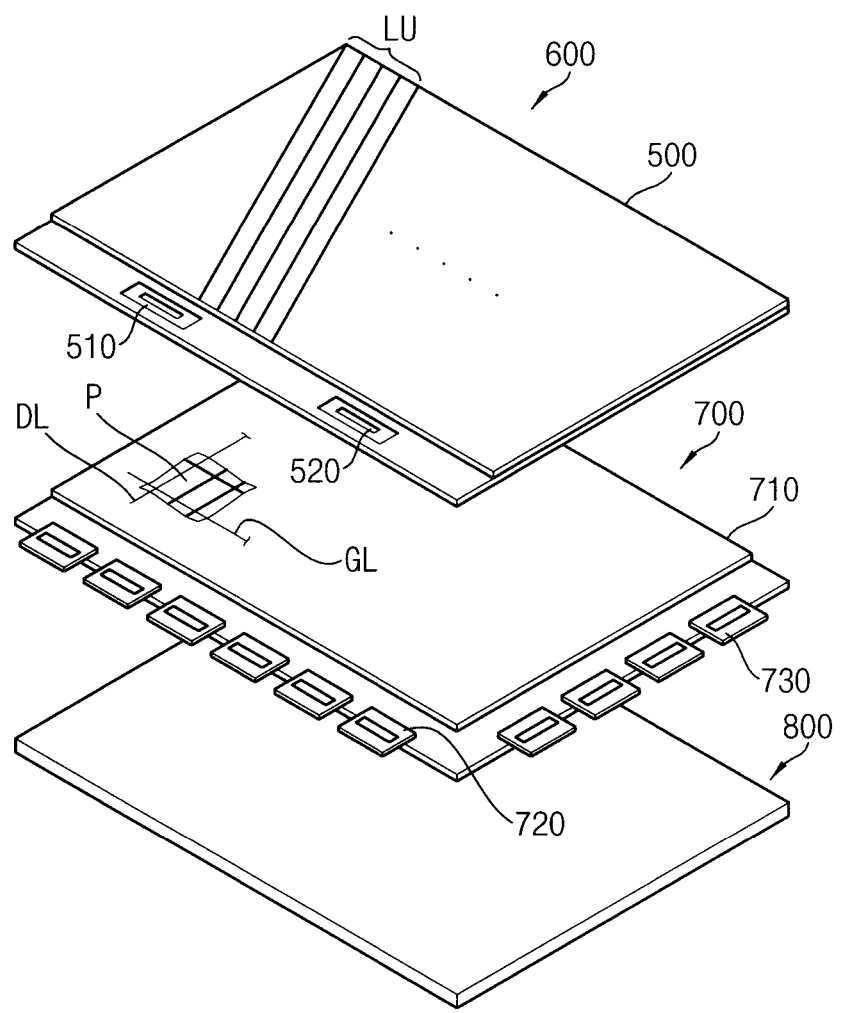
FIG. 5 is a perspective view illustrating an exemplary embodiment of a display apparatus including the lens panel of FIG. 1.

FIG. 5 is a perspective view illustrating an exemplary embodiment of a display apparatus including the lens panel of FIG. 1.

Referring to FIGS. 1 and 5, the display apparatus includes a lens panel unit 600, a display panel unit 700 and a light source unit 800.

The lens panel unit 600 includes a lens panel 500, a first lens driving chip 510 and a second lens driving chip 520. The lens panel 500 includes a plurality of unit lenses LU. The lens panel 500 is manufactured by the simplified manufacturing process mentioned above. Thus, the signal line and the pad electrode include a layered structure in which a first transparent conductive layer and a metal layer directly contact each other. The first lens driving chip 510 outputs a first driving signal to drive a first lens electrode of the unit lenses LU. The second lens driving chip 520 outputs the second driving signal to drive a second lens electrode of the unit lenses LU.

The display panel unit 700 includes a display panel 710, data driving part 720 and gate driving part 730. The display panel 710 includes a plurality of data lines DL, a plurality of gate lines GL and a plurality of pixels P. The data driving part 720 outputs a data signal to the data lines DL. The gate driving part 730 outputs a gate signal to the gate lines GL. The pixel P includes a switching element turned on in response to the gate signal and a liquid crystal capacitor charging the data signal through the switching element. The liquid crystal capacitor may include a pixel electrode, a common electrode, and a liquid crystal layer therebetween.

The light source unit 800 emits light to the display panel unit 700. The light source unit 800 may generate and supply the light to the display panel unit 700 by various methods, for example a global dimming, a local dimming and so on.

An exemplary embodiment of a method of driving the display panel 710 according to the invention will be described hereinafter.

In the 2D mode, the display panel unit 700 displays a 2D image on the display panel 710. The lens panel unit 600 drives the lens panel 500 in a white mode. The lens panel 500 transmits the light from the display panel 710 without refracting the light in the white mode. Thus, the display apparatus may display the 2D image.

In the 3D mode, the display panel unit 700 displays the 3D stereoscopic image. Thus, multi-view images for the 3D stereoscopic image are displayed on the display panel 710. The lens panel 500 refracts each of the multi-view images to multi-viewing points. In one exemplary embodiment, for example, when an image having nine viewing points is displayed on the display panel 710, the lens panel 500 refracts the nine-viewing-point image to each of the nine viewing points. Thus, the display apparatus may display the 3D stereoscopic image.

According to the exemplary embodiments of the invention, a signal line of a lens panel and a pad electrode of the lens panel are formed by a same mask, so that a manufacturing process of the lens panel may be simplified. Thus, a manufacturing cost of the lens panel and a display apparatus may be decreased.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A lens substrate comprising:
    a base substrate comprising a lens area, and a peripheral area which surrounds the lens area;
    a first signal line in the peripheral area and comprising a layered structure in which a first transparent conductive layer and a metal layer directly contact each other; and
    a first lens electrode in the lens area, and comprising the first transparent conductive layer excluding the metal layer, wherein the first lens electrode is connected to the first signal line.

2. The lens substrate of claim 1, further comprising:
    a second lens electrode in the lens area and comprising a second transparent conductive layer; and
    a second signal line in the peripheral area and comprising a layered structure in which the first transparent conductive layer and the metal layer directly contact each other, wherein the second signal line is connected to the second lens electrode.

3. The lens substrate of claim 2, further comprising a plurality of the first lens electrodes and a plurality of the second lens electrodes,
    wherein
    each of the first and second lens electrodes extends along a lens axis inclined with respect to a first axis, and
    the first and second lens electrodes alternate along a second axis which crosses the first axis, in a plan view.

4. The lens substrate of claim 2, further comprising:
    a first pad electrode in the peripheral area and connected to the first signal line; and
    a second pad electrode in the peripheral area and connected to the second signal line,
    wherein each of the first and second pad electrodes includes a layered structure in which the first transparent conductive layer and the metal layer directly contact each other.

5. The lens substrate of claim 4, further comprising:
    an insulation layer between the first lens electrode and the second lens electrode, the insulation layer comprising:
        a first contact hole which exposes an end portion of the first lens electrode;
        a second contact hole which exposes the first signal line adjacent to the first lens electrode; and
        a third contact hole which exposes the second signal line adjacent to an end portion of the second lens electrode.

6. The lens substrate of claim 5, wherein
    the first lens electrode is in contact with the base substrate, and
    the second lens electrode is in contact with the insulation layer.

7. The lens substrate of claim 5, further comprising:
    a first connecting line comprising the second transparent conductive layer, wherein the first connecting line connects the first lens electrode to the first signal line through the first and second contact holes; and
    a second connecting line continuous with the second lens electrode, wherein the second connecting line connects the second lens electrode to the second signal line through the third contact hole.

8. The lens substrate of claim 4, further comprising:
    an insulation layer between the first lens electrode and the second lens electrode, the insulation layer comprising:
        a fourth contact hole which exposes the first pad electrode;
        a fifth contact hole which exposes the first signal line adjacent to the first pad electrode;
        a sixth contact hole which exposes the second pad electrode; and
        a seventh contact hole which exposes the second signal line adjacent to the second pad electrode.

9. The lens substrate of claim 8, further comprising:
    a first pad connecting electrode comprising the second transparent conductive layer, wherein the first pad connecting electrode connects the first signal line to the first pad electrode through the fourth and fifth contact holes, and overlaps the first pad electrode; and
    a second pad connecting electrode comprising the second transparent conductive layer, wherein the second pad connecting electrode connects the second signal line to the second pad electrode through the sixth and seventh contact holes, and overlaps the second pad electrode.

10. A method for manufacturing a lens substrate, the method comprising:
    forming a first transparent conductive layer and a metal layer on a base substrate comprising a lens area, and a peripheral area surrounding the lens area;
    patterning the first transparent conductive and the metal layer using a same mask to form a first signal line in the peripheral area and a plurality of first lens electrodes in the lens area,
    wherein the first signal line includes a layered structure in which the first transparent conductive layer and the metal layer directly contact each other, and the first lens electrode includes the first transparent conductive layer excluding the metal layer;
    forming an insulation layer on the first signal line and the first lens electrode, and comprising a first contact hole and a second contact hole, the first contact hole exposing an end portion of the first lens electrode and the second contact hole exposing the first signal line adjacent to the end portion of the first lens electrode;
    forming a second transparent conductive layer on the insulation layer including the first and second contact holes; and
    patterning the second transparent conductive layer to form a first connecting line and a second lens electrode,
    wherein the first connecting line connects the first lens electrode to the first signal line through the first and second contact holes, and the second lens electrode is between adjacent first lens electrodes in a plan view.

11. The method of claim 10, wherein the forming the first lens electrode comprises:
    forming a second signal line including a layered structure in which the first transparent conductive layer and the metal layer directly contact each other, in the peripheral area.

12. The method of claim 11, wherein the forming the first lens electrode further comprises:

forming first and second pad electrodes including a layered structure in which the first transparent conductive layer and the metal layer directly contact each other, in the peripheral area.

13. The method of claim 12, wherein the forming the first lens electrode further comprises:

forming a first photo pattern and a second photo pattern on the metal layer, the first photo pattern having a first thickness and formed in an area including the first and second signal lines and the first and second pad electrodes, and the second photo pattern having a second thickness smaller than the first thickness and formed in an area including the first lens electrode;

forming the first and second signal lines and the first and second pad electrodes using the first and second photo patterns, each of the first and second signal lines and the first and second pad electrodes including a layered structure in which the first transparent conductive layer and the metal layer directly contact each other;

removing the second photo pattern and forming a third photo pattern on the first and second signal lines and the first and second pad electrodes, wherein a portion of the first photo pattern is removed to form the third photo pattern; and removing the metal layer using the third photo pattern to form the first lens electrode.

14. The method of claim 12, wherein the forming the insulation layer further comprises:

forming a fourth contact hole, fifth contact hole, sixth contact hole and seventh contact hole, wherein the fourth contact hole exposes the first pad electrode, the fifth contact hole exposes the first signal line adjacent to the first pad electrode, the sixth contact hole exposes the second pad electrode and the seventh contact hole exposes the second signal line adjacent to the second pad electrode.

15. The method of claim 14, wherein the forming the second lens electrode comprises:

forming a first pad connecting electrode and a second pad connecting electrode, wherein the first pad connecting electrode connects the first signal line to the first pad electrode through the fourth and fifth contact holes and overlaps the first pad electrode, and the second pad connecting electrode connects the second signal line to the second pad electrode through the sixth and seventh contact holes and overlaps the second pad electrode.

16. The method of claim 11, wherein the forming the insulation layer comprises:

forming a third contact hole through the insulation layer, the third contact hole exposing an end portion of the second lens electrode.

17. The method of claim 16, wherein the forming the second lens electrode comprises:

forming a second connecting line, wherein the second connecting line is continuous with the second lens electrode and connects the second lens electrode to the second signal line through the third contact hole.

18. The method of claim 10, further comprising:

forming a column spacer on the second lens electrode.

19. A lens panel comprising:

a lens substrate comprising:

a base substrate comprising a lens area, and a peripheral area surrounding the lens area;

a first signal line in the peripheral area and comprising a layered structure in which a first transparent conductive layer and a metal layer directly contact each other; and a first lens electrode in the lens area and comprising the first transparent conductive layer excluding the metal layer, wherein the first lens electrode is connected to the first signal line, an opposite substrate which faces the lens substrate; and a liquid crystal layer between the lens substrate and the opposite substrate.

20. The lens panel of claim 19, wherein the lens substrate further comprises a pad electrode in the peripheral area and connected to the first signal line, and the pad electrode includes a layered structure in which the first transparent conductive layer and the metal layer directly contact each other.

\* \* \* \* \*